(12) United States Patent
Wakasu

(10) Patent No.: US 6,259,801 B1
(45) Date of Patent: Jul. 10, 2001

(54) METHOD FOR INSERTING AND DETECTING ELECTRONIC WATERMARK DATA INTO A DIGITAL IMAGE AND A DEVICE FOR THE SAME

(75) Inventor: Yutaka Wakasu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/234,764

(22) Filed: Jan. 21, 1999

(51) Int. Cl.[7] .................................................. G06K 9/00
(52) U.S. Cl. ............................................................ 382/100
(58) Field of Search ..................................... 382/100, 232, 382/248, 250, 276

(56) References Cited

U.S. PATENT DOCUMENTS

| 5,778,102 | * | 7/1998 | Sandford, II et al. ............... 382/251 |
| 5,915,027 | * | 6/1999 | Cox et al. .............................. 380/54 |
| 6,031,914 | * | 2/2000 | Tewfik et al. ......................... 380/54 |

FOREIGN PATENT DOCUMENTS

| 0 854 633 A2 | 7/1998 | (EP) | ................................. H04N/1/32 |
| 0 859 503 A2 | 8/1998 | (EP) | ................................. H04N/1/00 |
| 0 860 997 A2 | 8/1998 | (EP) | ................................. H04N/5/913 |
| 5-30466 | 2/1993 | (JP) | ................................... H04N/5/91 |
| 6-315131 | 11/1994 | (JP) | ................................... H04N/5/91 |
| 8-241403 | 9/1996 | (JP) | .................................... G06T/1/00 |

OTHER PUBLICATIONS

"A secure imperceptable yet perceptually sailent, spread spectrum watermark for multimedia", Cox et al., Southcon Jun. 1996.*

"Secure spread spectrum watermarking for multimedia", Cox et al. IEEE, Image processing, vol. 6, No. 12, Dec. 1997.*

Nikkei Electronics, Apr. 22, 1996, No. 660, p. 13.

* cited by examiner

Primary Examiner—Andrew W. Johns
Assistant Examiner—Shervin Nakhjavan
(74) Attorney, Agent, or Firm—Scully, Scott, Murphy & Presser

(57) ABSTRACT

An image is divided into blocks, and different electronic watermark data are embedded into every block using a DCT transformer (103), electronic watermark data inserter (104), and IDCT transformer (107). At that time, reference is made to an electronic watermark data insertion position table (105) and electronic watermark data table (106) which specify that which electronic watermark data is to be inserted into which block of the image.

6 Claims, 3 Drawing Sheets

Fig. 3

| ROW NUMBER \ COLUMN NUMBER | 1 | 2 | 3 | 4 | 5 | 6 | 7 | 8 | 9 | ... | a-2 | a-1 | a |
|---|---|---|---|---|---|---|---|---|---|---|---|---|---|
| 1 | 1 | 2 | 3 | 4 | 1 | 2 | 3 | 4 | 1 | ... | 4 | 1 | 2 |
| 2 | 1 | 2 | 3 | 4 | 1 | 2 | 3 | 4 | 1 | ... | 4 | 1 | 2 |
| 3 | 1 | 2 | 3 | 4 | 1 | 2 | 3 | 4 | 1 | ... | 4 | 1 | 2 |
| 4 | 1 | 2 | 3 | 4 | 1 | 2 | 3 | 4 | 1 | ... | 4 | 1 | 2 |
| ... | ... | ... | ... | ... | ... | ... | ... | ... | ... | ... | ... | ... | ... |
| b-1 | 1 | 2 | 3 | 4 | 1 | 2 | 3 | 4 | 1 | ... | 4 | 1 | 2 |
| b | 1 | 2 | 3 | 4 | 1 | 2 | 3 | 4 | 1 | ... | 4 | 1 | 2 |

METHOD FOR INSERTING AND DETECTING ELECTRONIC WATERMARK DATA INTO A DIGITAL IMAGE AND A DEVICE FOR THE SAME

BACKGROUND OF THE INVENTION

1. Field of the Invention

The present invention generally relates to a field of a digital image processing, and in particular, to a technique for embedding or inserting identification data (electronic watermark data) having special information into a digital image.

2. Description of the Related Arts

Over the years, it has become a problem to copy digital images illegally. In order to prevent this illegal copy, it has been considered that digital image data are enciphered and only reproduction systems with a lawful cipher deciphering key can reproduce the enciphered digital image data. However, once the cipher is deciphered, this system can not prevent subsequent copies.

Therefore, in order to prevent an illegal use and copy of digital images, a method has been considered where special information (this information is referred to as electronic watermark data as described below) is embedded into the digital images themselves. As for such electronic watermark data for digital images, two kinds of data, such as visible and invisible electronic watermark data, are conceivable.

The visible electronic watermark data is made visually perceptible by synthesizing a special word or code for an image. Although such insertion of the visible electronic watermark data may cause deterioration of an image quality, it may visually evoke prevention of an illegal diversion to users of the digital images.

One example of embedment of visible electronic watermark data is disclosed in Japanese Patent Laid-Open Publication No. Hei 8-241403. In this approach, when visible electronic watermark data is synthesized into an original image, the electronic watermark data is synthesized into the original image by changing only a brightness component of pixels corresponding to opaque portions of the electronic watermark data by a scaling value without changing a color component. The scaling value is determined by a color component, a random number, and a value of pixels of the electronic watermark data.

In contrast, in the case of the invisible electronic watermark data, as the electronic watermark data is embedded into an image with care not to cause the image quality to be deteriorated, there is hardly any deterioration of the image quality originated from insertion of the electronic watermark data, so that the electronic watermark data embedded is visually imperceptible. If information capable of identifying an author is embedded into the image as this electronic watermark data, the author can be discriminated by detecting this electronic watermark data, even after an illegal copy has been performed. In addition, if information expressing disapproval of copying is embedded as this electronic watermark data, when a reproduction device detects the copy disapproval information, for example, the reproduction device can inform a user that the image is copy disapproval data or cause a copy prevention mechanism in the reproduction device to activate and restrict copying to a VTR or the like.

As one method for embedding invisible electronic watermark data into a digital image, there is a method in which special information as electronic watermark data is embedded into some portions with little effect to an image quality such as the least significant bit (LSB) or the like of pixel data. However, in this method, the electronic watermark data can easily be removed from the image. For example, if an image with the embedded electronic watermark data is subjected to a low-pass filtering, information of LSB of a pixel would be lost, so that the electronic watermark data can be removed without any appreciable deterioration. In addition, as an image compression processing reduces an amount of data by reducing an amount of information in portions with less effect on the image quality, the electronic watermark data can be removed without significant degradation of the image quality by causing such image data with the embedded electronic watermark data to be subjected to a compression and decompression process.

Alternatively, another example is disclosed in Japanese Patent Laid-Open Publication No. Hei 6-315131. This technique described in the publication detects an area where an image is not deteriorated even if the area is displaced by a peripheral area when the image is reproduced by utilizing a correlation of images in successive frames, and embeds specific information into the area by converting the level in the area to be converted. This approach detects the electronic watermark data and reconstructs the image by identifying the area into which identification data has been embedded by using a signal missing portion and conversion information and by correcting this identified area by using peripheral data in the identified area when the image is reproduced.

As yet another example, Japanese Patent Laid-Open Publication No. Hei 5-30466 discloses a method where a frequency of an image signal is converted and the information having lower frequency signal than a frequency range of the image signal whose frequency has been converted is embedded. This method takes out the original image signal using a high-pass filter and the identification data embedded using a low-pass filter.

As yet another example for frequency-converting an image, a method is proposed where an image is frequency-converted and electronic watermark data is embedded into an area with strong frequency components in an image signal after frequency conversion has been performed (Nikkei Electronics, Apr. 22, 1996, No. 660, page 13). This method embeds the electronic watermark data into the area with strong frequency components, so that, even if the image is subjected to an image process such as compression and decompression processes or filtering process, the electronic watermark data may not be lost. The electronic watermark data can not be removed, as long as the original data is destroyed. Furthermore, by adopting random numbers according to a normal distribution, an interference between the electronic watermark data may be prevented, and also by embedding, the deterioration of the image quality based on the embedment of the electronic watermark data may be precluded.

The method for embedding electronic watermark data in this method is that an original image is transformed into frequency components using DCT (discrete cosine transformation) or the like, n data of $f(1), f(2), \ldots, f(n)$ are selected which represent high values in a frequency domain, electronic watermark data of $w(1), w(2), \ldots, w(n)$ are selected from a normal distribution whose average is 0 and variance is 1, and the following equation is calculated for each i.

$$F(i)=f(i)+\alpha \times |f(i)| \times w(i)$$

wherein $\alpha$ is a scaling factor.

The image with the embedded electronic watermark data can then be obtained by subjecting $F(i)$ to the inverse DCT transformation.

Detection of the electronic watermark data is performed using the following method. In this detection method, the original images f(i) and electronic watermark data candidates w(i) (where i=1, 2, ..., n) must be known.

Firstly, the image with the embedded electronic watermark data is caused to be transformed into frequency components using DCT, and element values corresponding to f(1), f(2), ..., f(n) into which the electronic watermark data are embedded in the frequency domain are made F(1), F(2), ..., F(n). The electronic watermark data W(i) are calculated and extracted by f(i) and F(i) using the following equation.

$$W(i)=(F(i)-f(i))/f(i)$$

Next, the statistical resemblance of w(i) and W(i) are calculated using a vector inner product and the following equation.

$$C=W{\cdot}w/(WD/wD)$$

where:

W=(W(1), W(2), ..., W(n));
w=(w(1), w(2), ..., w(n));
WD=an absolute value of vector W;
wD=an absolute value of vector w; and
• is an inner product of a vector.

When the statistical resemblance C is larger than some specific value, it is estimated that the applicable electronic watermark data may be embedded.

If the electronic watermark data is embedded into an image using this method, it is effective when an author having the original image performs detection processing to a digital image which is assumed to be an illegal copy. This method needs the original image, so that the electronic watermark data can be detected when the author performs the detection processing to an image data which is assumed to be an illegal copy, however, in reproduction devices in each terminal can not detect the electronic watermark data because the reproduction devices have no original image.

Therefore, a method has been proposed where this method is improved for a terminal processing, particularly for an MPEG system. In the method, the original image is divided into blocks of 8 pixels×8 pixels, and the electronic watermark data is embedded into and extracted from the blocks as a processing unit.

The embedding process of the electronic watermark data will be performed using the following procedure. First, in a frequency domain after the discrete cosine transformation has been performed in the MPEG encoding process, f(1), f(2), ..., f(n) are defined sequentially from lower frequency components in AC components, and electronic watermark data w(1), w(2), ..., w(n) are selected from a normal distribution whose average is 0 and variance is 1, and the following equation is calculated for each i:

$$F(i)=f(i)+\alpha \times \mathrm{avg}(f(i)) \times w(i)$$

where α is a scaling factor and avg(f(i)) is a partial average which is the average of absolute values of three points in the neighborhood of f(i).

Then, the subsequent process of the MPEG encoding process is performed using F(i) instead of f(i).

The electronic watermark data will be detected using the following procedure. In this detection method, the original image is not needed, but only the electronic watermark data candidates w(i) (where i=1, 2, ..., n) are needed to be known.

In a frequency domain of the blocks after an inverse quantization in an MPEG decompression or decoding process is completed, F(1), F(2), ..., F(n) are defined sequentially from lower frequency components. An average of absolute values of three points of F(i−1), F(i), and F(i+1) in the neighborhood of F(i) is defined as a partial average avg(F(i)), and the electronic watermark data W(i) are calculated by the following equation:

$$W(i)=F(i)/\mathrm{avg}(F(i))$$

and further sum WF(i) of an image are calculated for each i.

Next, the statistical resemblance of w(i) and WF(i) are calculated using inner products of vectors and the following equation.

$$C=WF{\cdot}w/(WFD \times wD)$$

When the statistical resemblance C is larger than some specific value, it is estimated that the applicable electronic watermark data may be embedded.

In the example disclosed in Japanese Patent Laid-Open Publication No. Hei 6-315131, the electronic watermark information are not embedded into all frames, so that illegal copy can not be prevented for frames without an electronic watermark embedded. Additionally, this example presupposes that successive frames are still images and there is no change in the successive frames, so that in cine images including a fast moving object, an area into which the electronic watermark data is embedded can not be identified, making it impossible to embed the electronic watermark data.

In addition, in the example disclosed in Japanese Patent Laid-Open Publication No. Hei 5-30466, the electronic watermark data is embedded into lower frequency domain than that of after an image has been frequency-transformed, so that the electronic watermark data can be easily removed using a high-pass filter.

Furthermore, in the example where the electronic watermark data is embedded into a strong portion in frequency components after an image has been frequency-transformed, the electronic watermark data can not be removed by a filter or the like. However, when plural electronic watermark data are embedded into one image, there is a problem that, if plural electronic watermark data are embedded into the same frequencies, the electronic watermark data are negated each other, thereby lowering a detectability factor at the time of detection.

SUMMARY OF THE INVENTION

It is an object of the present invention to provide an electronic watermark data inserter and detector where, even when plural electronic watermark data are inserted into an image, the electronic watermark data can be inserted without negation each other, and at the time of detection, the electronic watermark data can be detected properly.

In the method for inserting identification data (electronic watermark data) according to the present invention, an image is frequency-transformed for each block of j×k pixels (where j and k are natural numbers), and when the electronic watermark data are inserted into the frequency components transformed, the electronic watermark data are inserted for each block after the kinds of the electronic watermark data to be inserted are changed, so that the electronic watermark data are inserted without negation each other and detected for each block. More particularly, an electronic watermark insertion position table is provided indicating which kind of electronic watermark data is inserted into which block in an image, and an applicable electronic watermark data is inserted into the area which is shown in the insertion area table. When the electronic watermark data is detected, the electronic watermark extraction position table similar to that when inserted is used to detect the electronic watermark data.

In the present invention, when a plurality of electronic watermark data are inserted into an image, different electronic watermark data are inserted into for each block, so that the electronic watermark data can be inserted without interference of the different electronic watermark data and negation each other, and also the electronic watermark data can be detected properly even when a plurality of electronic watermark data are embedded.

BRIEF DESCRIPTION OF THE DRAWINGS

FIG. 3 is a schematic diagram showing insertion positions into an image for each kind of electronic watermark data.

DETAILED DESCRIPTION OF THE PREFERRED EMBODIMENTS

The embodiments according to the present invention will hereinbelow be described in further detail with reference to the accompanying drawings.

Figure 1:
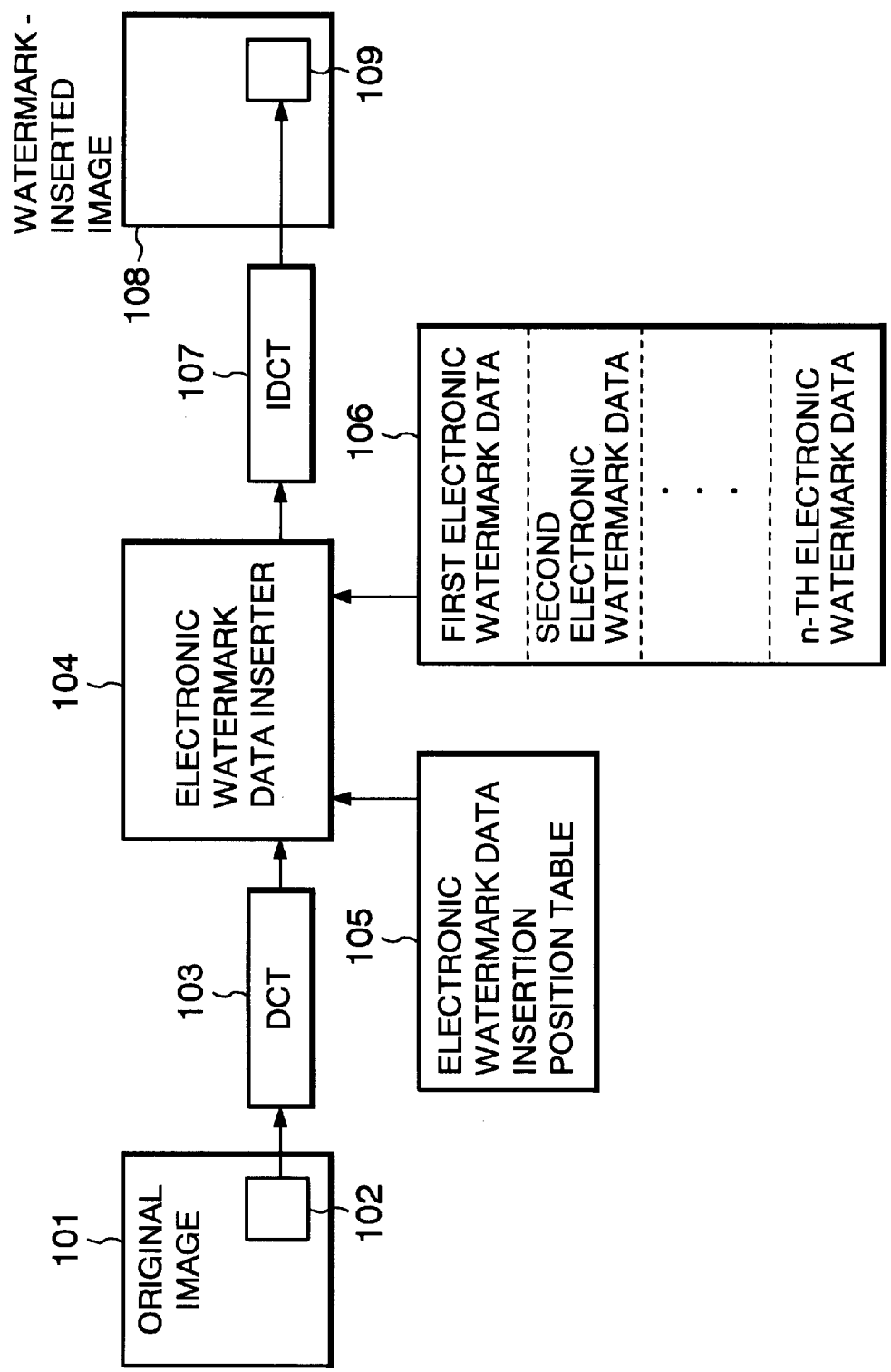
FIG. 1 is a block diagram showing an electronic watermark data insertion device according to the present invention.

FIG. 1 is a block diagram showing an insertion device for electronic watermark data when n kinds of electronic watermark data are inserted into an image data.

Referring to FIG. 1, an embodiment of the insertion device according to the present invention comprises a DCT transformer 103 outputting position information of a block of j×k pixels which is taken out from an image and subjected to an orthogonal transformation such as a discrete cosine transformation (DCT) and data after the orthogonal transformation; an electronic watermark data insertion position table 105 which records into what position of a block in the image each of n kinds of electronic watermark data is to be inserted; an electronic watermark data table 106 which stores the n kinds of the electronic watermark data; an electronic watermark data inserter 104 which takes out applicable electronic watermark data from the electronic watermark data table 106 according to the electronic watermark data insertion position table 105 and the DCT transformer 103 and inserts the electronic watermark data into the data after DCT transformation; and an IDCT transformer 107 which subjects the data after the DCT transformation in blocks, into which the electronic watermark data are inserted, to an inverse discrete cosine transformation (IDCT).

Figure 2:
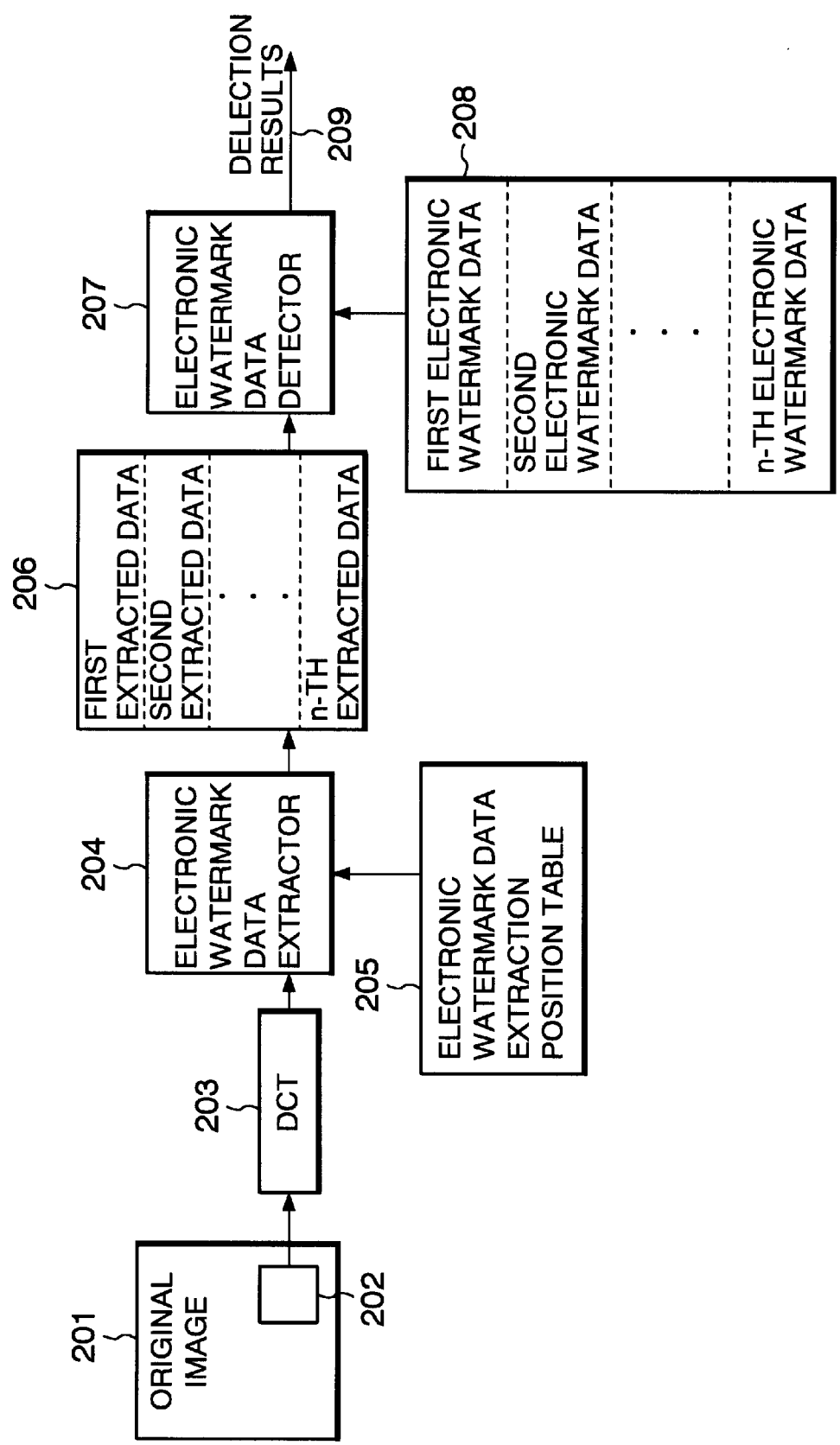
FIG. 2 is a block diagram showing an electronic watermark data detection device according to present Invention.

FIG. 2 is a block diagram showing a detection device for electronic watermark data when n kinds of electronic watermark data are inserted into an image data.

Referring to FIG. 2, an embodiment of the detection device according to the present invention comprises a DCT transformer 203 which outputs position information of blocks of j×k pixels which are taken out from an image and subjected to a DCT (discrete cosine transformation) and data after the DCT transformation; an electronic watermark data extraction position table 205 which stores information indicating that from what position of block in the image each of n kinds of electronic watermark data is taken out; an extracted data table 206 which stores the n kinds of extracted data for a screen; an electronic watermark data table 208 which stores the n kinds of the electronic watermark data; an electronic watermark data extractor 204 which takes out electronic watermark data from frequency data for j×k pixels output by the DCT transformer 203 according to the position information outputted by the DCT transformer 203 and stores the data taken out in predetermined positions of the extraction data table 206; and an electronic watermark data detector 207 which takes out the m-th data (m=1, 2, . . . , n) from the electronic watermark data table 208 and the extracted data table 206 and calculates statistical resemblance for the data taken out and the electronic watermark data.

In the present invention, the contents of the electronic watermark data table and the electronic watermark data position table of the corresponding number must be accordant in the insertion and detection sides. That is, the correspondent contents of the m-th (m=1, 2, . . . , n) electronic watermark data table in the insertion and detection sides must be accordant each other. Additionally, the contents of the electronic watermark data insertion position table 105 in the insertion device side and the electronic watermark data extraction position table 205 in the detection device side must also be accordant.

With reference to FIG. 1, the operation of the electronic watermark data insertion device will be described.

The DCT transformer 103 takes out block data 102 of a size of 8×8 pixels from an original image 101 to perform a DCT transformation. The electronic watermark data inserter 104 takes out a number of the electronic watermark data to be inserted from the electronic watermark data insertion position table 105 on the basis of block position data which is outputted by the DCT transformer 103. Then, the electronic watermark data inserter 104 takes out the electronic watermark data coincident with the number taken out from the electronic watermark data insertion position table 105 from the electronic watermark data table 106 to insert the electronic watermark data into the data after the DCT transformation which is output by the DCT transformer 103.

The IDCT transformer 107 performs an IDCT transformation to the data outputted by the electronic watermark data inserter 104, and stores the data into the same position 109 as the position from which the DCT transformer 103 has taken out the block data in an image storage area 108 with the electronic watermark data to be inserted.

The operation described above will be performed for all blocks designated by the electronic watermark data insertion position table 105. Incidentally, the original image data 101 in the blocks not designated by the electronic watermark data insertion position table 105 are copied directly into a memory which temporarily stores the image data 108 by a processing route not shown in FIG. 1.

Next, with reference to FIG. 2, the operation of the electronic watermark data detection device will be described.

The DCT transformer 203 takes out block data 202 of the size of 8×8 pixels from an image 201 to perform a DCT transformation. The electronic watermark data extractor 204 acquires a number of the electronic watermark data to be extracted from the electronic watermark data extraction position table 205 on the basis of the position data of the 8×8 block which is outputted by the DCT transformer 203. Then, the electronic watermark data extractor 204 extracts the electronic watermark extracted data from the frequency data after the DCT transformation which is outputted by the DCT transformer 203, and stores into a position corresponding to an electronic watermark data number taken out from the electronic watermark data extraction position table 205 in the extracted data storage area 206.

The operation described above will be performed for all blocks designated by the electronic watermark data extraction position table 205.

After the extraction data for a screen are stored into the extracted data storage area 206, the electronic watermark data detector 207 takes out the correspondent extracted data and electronic watermark data from the extracted data storage area 206 and the electronic watermark data table 208, and calculates the statistical resemblance to output the results 209.

When there are n kinds of electronic watermark data, the electronic watermark data detector 207 repeats the operation described above for n times, and calculates the statistical resemblance of all of the electronic watermark data and the extracted data to output the results 209.

FIG. 3 is a schematic diagram showing the electronic watermark data insertion position table indicative of the position into which each of the electronic watermark data is inserted and the values of the detection position table when four kinds of electronic watermark data are inserted. The image data for a screen are divided into a block size of j×k pixels as shown in FIG. 3 and numbers are stored indicating what sequence of the electronic watermark data to be inserted for each block.

The example in FIG. 3 designates that, when the upper left of an image is made origin, first electronic watermark data is inserted at the block of column number 1 and row number 1 and second electronic watermark data is inserted at the block displaced one block in the horizontal direction.

With reference to FIGS. 1 and 3, the operation of the electronic watermark insertion device will be explained more specifically.

The DCT transformer 103 takes out the block data 102 of a size of j×k pixels from the position of row number 1 and column number 1 in the original image 101 to perform the DCT transformation, and outputs data indicating the row and column numbers and frequency data after DCT transformation. The electronic watermark data inserter 104 takes out number 1 of the electronic watermark data to be inserted from the electronic watermark data insertion position table 105 on the basis of the position data of row number 1 and column number 1 of the block output by the DCT transformer 103.

Then, the electronic watermark data inserter 104 takes out first electronic watermark data coincident with number 1 of the electronic watermark data from the electronic watermark data table 106, and inserts the first electronic watermark data into the frequency data after DCT transformation outputted by the DCT transformer 103. The IDCT transformer 107 executes the IDCT transformation to the data which is output by the electronic watermark data inserter 104, and stores the data into the same position of row number 1 and column number 1 as the position from which the DCT transformer 103 has taken out the block data in the area 108 into which the image with the inserted electronic watermark data is to be stored.

Then, the block data of row number 1 and column number 2 is subjected to the similar processing. The operation described above is performed for all blocks designated by the electronic watermark data insertion position table 105 (in the example in FIG. 3, for all blocks in the image data).

Next, with reference to FIGS. 2 and 3, the operation of the electronic watermark data detection device will be explained more specifically.

The DCT transformer 203 takes out block data 202 of the size of 8×8 pixels from the position of row number 1 and column number 1 in the image 201 to perform the DCT transformation, and outputs the row and column number data and the frequency data after the DCT transformation. The electronic watermark data extractor 204 acquires the number 1 of the electronic watermark data to be extracted from the electronic watermark data extraction position table 205 on the basis of the position data of the block of row number 1 and column number 1 output by the DCT transformer 203.

Then, the electronic watermark data extractor 204 extracts the electronic watermark data from the frequency data after the DCT transformation outputted by the DCT transformer 203, and stores into the first extraction area corresponding to the electronic watermark data number 1 in the extracted data storage area 206.

Then, the block data of row number 1 and column number 2 is subjected to the similar processing. The operation described above is performed for all blocks designated by the electronic watermark data extraction position table 205 (in the example in FIG. 3, for all blocks in the image data).

After the extracted data for a screen are stored into the extracted data storage area, the electronic watermark data detector 207 takes out the first extracted data from the extracted data storage area 206 and the first electronic watermark data from the electronic watermark data table 208, and calculates the statistical resemblance to output the results 209.

Next, the electronic watermark data detector 207 takes out second extraction data from the extracted data storage area 206 and second electronic watermark data from the electronic watermark data table 208, and calculates the statistical resemblance to output the results 209.

In a like manner, third extraction data and third electronic watermark data and fourth extraction data and fourth electronic watermark data are also subjected to the similar processing.

As set forth hereinabove, the present invention divides an image into a block unit of j×k pixels and changes electronic watermark data to be inserted for each block, so that, when a plurality of electronic watermark data are inserted into an image, the trouble can be prevented where the plural electronic watermark data negate each other.

Modifications of the invention herein disclosed will occur to a person skilled in the art and all such modifications are deemed to be within the scope of the invention as defined by the appended claims.

What is claimed is:

1. An electronic watermark data insertion device into a digital image, comprising:

an orthogonal transformer which outputs position information of an image block of j×k pixels which is taken out from an image and subjected to an orthogonal transformation and data after the orthogonal transformation;

an electronic watermark data insertion position table which records into what position of block in the image each of n kinds of electronic watermark data is to be inserted;

an electronic watermark data table which stores the n kinds of the electronic watermark data; and an electronic watermark data inserter which takes out an electronic watermark data number from an applicable position of said electronic watermark data insertion position table on the basis of the position information which is outputted by said orthogonal transformer and the electronic watermark data coincident with the taken out electronic watermark data number from said electronic watermark data table to insert the electronic watermark data into data after the orthogonal transformation.

2. The insertion device as claimed in claim 1, wherein said device further comprises:

an inverse orthogonal transformer performing an inverse orthogonal transformation to the image block into which the electronic watermark data has been inserted.

3. An electronic watermark data detection device into a digital image, comprising:

an orthogonal transformer which takes out an image block of a size of j×k (j and k are natural numbers) from a digital image to perform an orthogonal transformation and outputs position information of the image block taken out and data after the orthogonal transformation;

an electronic watermark data extraction position table which stores that from what position of image block in the image each of image data including n kinds of electronic watermark data is taken out;

an extraction data table which stores n kinds of extraction data for a screen;

an electronic watermark data table which stores the n kinds of the electronic watermark data;

an electronic watermark data extractor which takes out an electronic watermark number from said electronic watermark data extraction position table on the basis of the position information which is outputted by said orthogonal transformer, extracts frequency data including electronic watermark data from the frequency data of the block which is outputted by said orthogonal transformer, and stores data into the predetermined position in said extraction data table coincident with the electronic watermark data number taken out; and an electronic watermark data detector which takes out the m-th data (m=1, 2, . . . , n) from said electronic watermark data table and said extraction data table and calculates statistical resemblance for the data taken out and electronic watermark data.

4. A method for inserting electronic watermark data into a digital image, comprising the steps of:

preparing previously an electronic watermark data insertion position table which records that into what position of block of a size of j×k pixels (j and k are natural numbers) in an image each of n kinds of electronic watermark data is inserted and an electronic watermark data table which stores n kinds of electronic watermark data;

taking out an image block from a digital image to perform an orthogonal transformation and acquiring position information of the image block taken out and data after the orthogonal transformation; and taking out an electronic watermark data number from the applicable position of said electronic watermark data insertion position table on the basis of said position information, taking out the electronic watermark data coincident with the electronic watermark data number taken out from said electronic watermark data table, and inserting the electronic watermark data into the data after orthogonal transformation.

5. A method as claimed in claim 4, wherein said method further comprises the step of:

performing an inverse orthogonal transformation to the block into which the electronic watermark data is inserted.

6. A method for detecting electronic watermark data into a digital image, comprising the steps of:

preparing previously an electronic watermark data extraction position table which records that from what position of block of a size of j×k pixels (j and k are natural numbers) in an image each of image data including n kinds of electronic watermark data is extracted and an electronic watermark data table which stores n kinds of electronic watermark data;

taking out a block from a digital image to perform an orthogonal transformation and acquiring position information of the image block taken out and the data after the DCT transformation;

taking out an electronic watermark data number from said electronic watermark data extraction position table on the basis of said position information, extracting frequency data including the electronic watermark data from frequency data of the block which is output by said DCT transformer, and storing the data into a predetermined position of an extraction data table coincident with the electronic watermark data number taken out;

taking out the m-th data (m=1, 2, . . . , n) from said electronic watermark data table and said extraction data table and calculating statistical resemblance for the extracted data and electronic watermark data; and estimating whether this statistical resemblance is large or not for every said n electronic watermark data.

* * * * *